Dec. 29, 1936.　　　G. M. BARNES　　　2,065,508
TRACK FOR TRACK LAYING VEHICLES
Filed Jan. 14, 1935
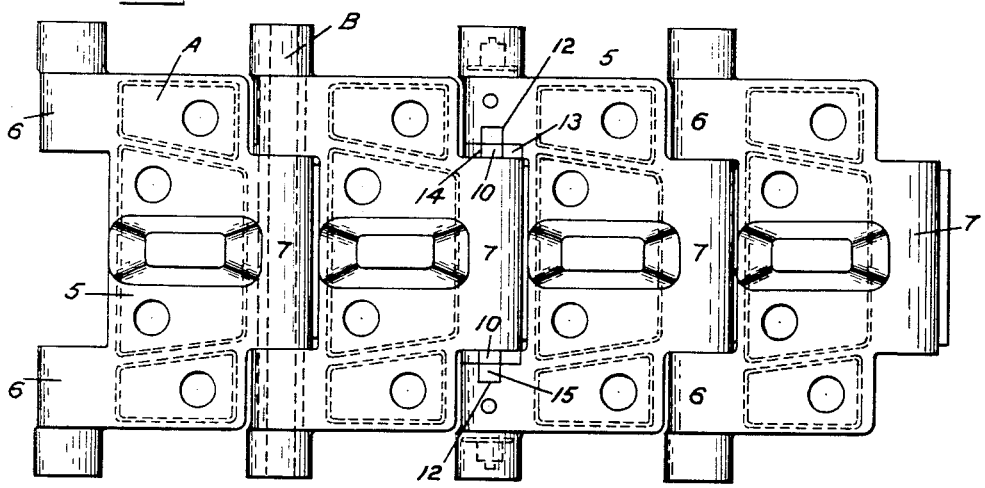
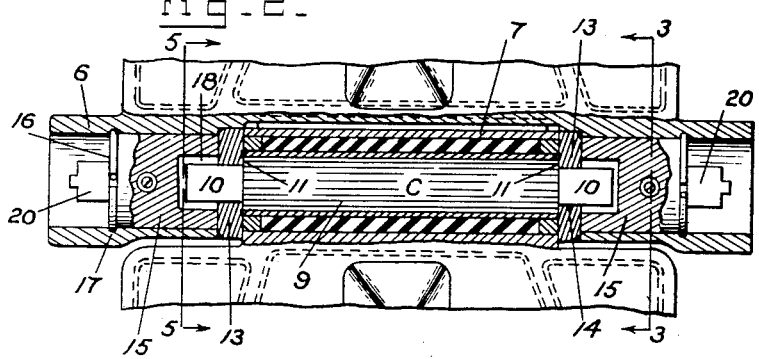
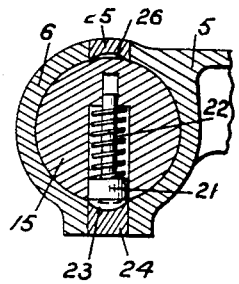
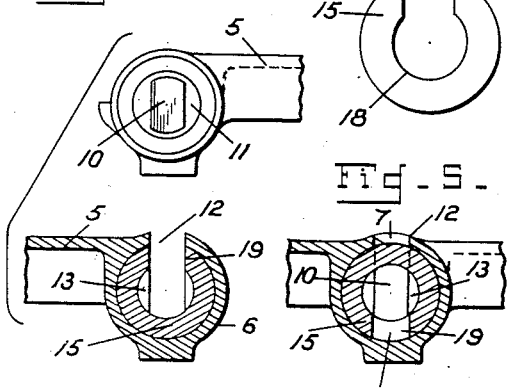
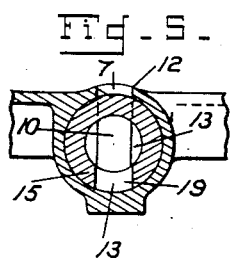
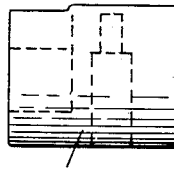
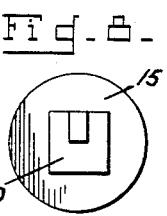
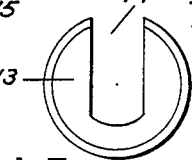
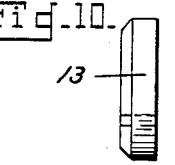
Inventor
Gladeon M. Barnes
By W. N. Roach
Attorney Patented Dec. 29, 1936

2,065,508

UNITED STATES PATENT OFFICE 2,065,508

TRACK FOR TRACK-LAYING VEHICLES

Gladeon M. Barnes, Hastings, Mich.

Application January 14, 1935, Serial No. 1,675

5 Claims. (Cl. 74—254)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for track-laying vehicles.

The usual method of disconnecting adjoining links of a track consists in removing the link pin. After the track has been in use the task of driving out the link pin requires considerable time.

The purpose of this invention is to provide a novel coupling for adjoining track shoes whereby the shoes may be easily and quickly connected and disconnected without driving out the link pin. A further object is to arrange the coupling so that the link pin is held against turning.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is an inside plan view of a portion of the track with adjoining links connected.

Fig. 2 is a transverse sectional view through the special joint.

Fig. 3 is a sectional view on the line 3—3 of Fig. 2.

Fig. 4 is a sectional view on the line 5—5 of Fig. 2 but showing the adjoining links in separated position.

Fig. 5 is a sectional view on the line 5—5 of Fig. 2.

Figs. 6, 7, and 8 are detail views of the locking cylinder.

Figs. 9 and 10 are detail views of the stirrup disc.

The track comprises a series of grousers or shoes A constituting link members connected by means of link pins B and one or more special link pins C.

Each shoe consists of a body 5 having spaced bearings 6—6 on one end and a single centrally located bearing 7 on the opposite end whose width is substantially equal to the spacing between the end bearings. When two shoes are assembled end to end the bearing 7 of one shoe is adapted to fit between the spaced bearings 6 of the other shoe.

The link pins B pass through the aligned bearings 6 and 7 of adjoining shoes and are of any suitable type, preferably that shown in Patent No. 1,970,568 of August 21, 1934.

In order to permit certain of the track shoes to be quickly disconnected they are modified to take the special link pin C which has a central cylindrical portion 9 equal in length to the single bearing 7 and non-circular ends 10—10 which are oblong in cross-section and form shoulders 11—11 on the ends of the central portion 9. The ends 10—10 are inserted in the bearings 6 by a movement radially of the bearings (Fig. 4) and to this end the bearings are each formed with a slot 12. The mounting of the pin C in the bearing 7 is disclosed in the above mentioned patent.

The inner ends of each bearing 6 include a stirrup comprising a disc 13 closing the end of the bearing and secured thereto by welding 13ª. The disc 13 has a slot 14 in alignment with the slot 12 and adapted to receive and seat one of the ends 10 of the link pin C which is thereby held against rotation. The link pin is held against axial displacement by virtue of the engagement of its shoulders 11—11 with the discs 13 in the spaced bearings 6—6.

A locking cylinder 15 is rotatably mounted in each bearing 6 and is held against axial displacement by the disc 13 and by a resilient split ring 16 which seats in an annular groove 17 in the bearing. The inner end of the locking cylinder is formed with a keyhole slot having a circular recess 18 and an entrance 19 corresponding to and adapted to be aligned with the slot 12 in the bearing so that the end 10 of the link pin may be introduced into the recess 18. The end 10 is disposed in the recess 18 when it is seated in the slot 14 of the disc 13.

With the end 10 in the recess 18, the locking cylinder 15 is rotated 180° by applying a socket wrench to a squared stem 20 on its outer end. In this position, as shown in Fig. 5, the locking cylinder blocks the slot 12 in the bearing and holds the end 10 of the link pin against withdrawal. The cylinder is normaly maintained in the locking position by means of a plunger 21 which it carries and which is urged by a spring 22 into a recess 23 formed in a plug 24 in the bearing 6. In the unlocked position the plunger enters a recess 25 in a second plug 26.

The operation of disconnecting the shoes consists in turning the two locking cylinders of a joint through 180° to bring the entrance 19 of the keyhole slot into register with the slots 12 and 14 as shown in Fig. 4, and then moving the shoes relatively to one another until the ends 10 of the link pin C are withdrawn from the bearings 6—6. This procedure is reversed in connecting the shoes.

I claim:

1. In a track for vehicles, adjoining links, a bearing on one link, a link pin passing through said bearing and having non-circular ends, spaced bearings on the other link and each formed with a slot, a disc fixed on the inner end of each bearing and having a slot registering with the slot in the bearing, said slots receiving the non-circular ends of the link pin, a locking cylinder rotatably mounted in each spaced bearing and having a keyhole slot with an entrance opening in the wall and adapted to register with the slot in the bearing, means for holding the cylinder in position of rotational adjustment and means for holding the cylinder against the disc.

2. In a track for vehicles, adjoining links, a bearing on one link, a link pin passing through said bearing and having non-circular ends, spaced bearings on the other link and each formed with a slot, a disc fixed on the inner end of each bearing and having a slot registering with the slot in the bearing, said slots receiving the non-circular ends of the link pin, a locking cylinder rotatably mounted in each spaced bearing and having a keyhole slot with an entrance opening in the wall and adapted to register with the slot in the bearing.

3. In a track for vehicles, adjoining links, a bearing on one link, a link pin passing through said bearing and having non-circular ends, spaced bearings on the other link and each formed with a slot, a disc fixed on the inner end of each bearing and having a slot registering with the slot in the bearing, said slots receiving the non-circular ends of the link pin, and a locking cylinder in each bearing about the non-circular end of the link pin to close the slot in the bearing and confine the end of the link pin.

4. In a track for vehicles, adjoining links, a bearing on one link, a link pin passing through said bearing and having non-circular ends, spaced bearings on the other link and each formed with a slot for receiving a non-circular end of the link pin by a movement radially of the bearing, said slots shaped to cooperate with the non-circular ends of the link pin to hold the link pin against rotational movement, and a locking cylinder rotatably mounted in each spaced bearing and having a keyhole slot with an entrance opening in the wall and adapted to register with the slot in the bearing, said cylinder rotatable about the non-circular end of the link pin.

5. In a track for vehicles, adjoining links, a link pin carried by one link and having non-circular projecting ends, spaced bearings on the other link and each formed with a slot for receiving a non-circular end of the link pin, said slots shaped to cooperate with the non-circular ends of the link pin to hold the link pin against rotational movement, and a locking member in each spaced bearing and coaxial with the link pin, said member rotatable to confine the end of the link pin.

GLADEON M. BARNES.